6,707. ARTIFICIAL CAOUTCHOUC. A. G. Day, New York, N. Y. Patent No. 58,615, dated Oct. 9, 1866; antedated Sept. 29, 1866. [Filed Sept. 6, 1875.]

*To all whom it may concern:*

Be it known that I, AUSTIN G. DAY, of the State, county, and city of New York, have invented a new Compound, which I term "Artificial Caoutchouc," and which is adapted to be used for some purposes wholly, and for other purposes partly, as a substitute for natural india-rubber; and I hereby declare that the following is a full, clear, and exact description of the same.

The great and increasing cost of crude rubber renders it of much importance to obtain some substance which is suitable to either wholly or partly take the place of it in the arts; and the object of my invention is to provide a composition for this purpose which can be produced readily and at a reasonable price.

It has long been known that certain oils can be vulcanized; but the vulcanization of an oil is not, by itself, of any great value. To make it of practical use it must be combined with some resinous substance, such as liquid coal-tar, asphaltum, bitumen, raw turpentine, &c., in order that the mixture may have body and character. For several years my efforts have been directed to rendering compounds of this nature serviceable as a substitute for india-rubber, and I have at last been able to successfully vulcanize vegetable and mineral oils, in combination with resinous substances. I thereby, from materials which are abundant and cheap, obtain a composition which possesses to a certain extent an elasticity and flexibility, as well as other qualities, which adapt it to be used more or less in place of rubber.

This invention, therefore, consists in a new compound or product formed by combining vegetable and mineral oils with gum-resins, or other resinous bodies, and sulphur, at a temperature sufficient to produce vulcanization of the mass.

The oil or oils and the resinous body or bodies should be first mixed together under heat, and then the sulphur should be added and the temperature increased until the vulcanization is effected.

In several respects, chemically speaking, the vegetable and mineral oils and the resinous bodies which I employ are like each other, and have characteristics in common; but for the purpose of this invention I treat the oils as one class of ingredients and the resinous bodies as another class. As examples of vegetable and mineral oils which may be used for my new compound, there may be mentioned cotton-seed oil, linseed-oil, hemp and rape seed oil, pea-nut oil, castor-oil, &c., and suitable examples of resinous bodies are coal-tar, asphaltum, bitumen, turpentine, rosin, copal, &c. Any of these members of these respective classes of articles, as well as most, if not all, the other members of them known to chemists, will, when combined with each other and with sulphur, and vulcanized, present to a greater or less degree the new compound which I have invented.

The practical method of preparing any of them, respectively, to be mixed together, and the treatment under which they can be made to combine and become vulcanized so as to produce the desired result, are also substantially the same in all cases, although the natural condition of some of the articles is different from that of others, and the temperature at which some of them will enter into the combination will not answer for others. Thus some of the materials, such as petroleum, spirits of turpentine, coal-tar, &c., are naturally in a liquid state. Others, such as rosin, paraffine, &c., can be made liquid at a slight elevation of temperature. Others again, such as asphaltum, bitumen, copal, &c., require a high heat to bring them into a liquid condition. Again, the temperature to which the combined oils and resinous bodies must be raised to unite with the sulphur will be very different in different cases. Thus linseed-oil readily combines with sulphur at the moderate heat of 288° Fahrenheit, while castor-oil will require a heat of 320° Fahrenheit. The lengths of heating-time requisite to produce vulcanization will also vary under different circumstances; but, as a general rule, it will be found, as in the case of natural india-rubber compounds, that the lower the temperature employed the greater the time which will be required to effect a complete vulcanization, and the higher the temperature the less the time. In short, each material or combination of materials will require a more or less definite and a different heat—higher or lower, according to its or their character—and a longer or shorter time of heating, according to the varying circumstances or purposes of the treatment.

These general remarks are all which can be conveniently stated in a specification upon these points; but if they are kept in mind, and if attention be paid to the description of the manipulation employed in the following examples of combinations with which I have successfully made my new product, the practical chemist will have no difficulty in producing a substantially similar result with any members of the respective classes of ingredients mentioned, whether such members are or are not specially named herein.

An illustrative example, which will embody my invention, may be one pound cotton-seed oil, one pound coal-tar, and one pound sulphur. These ingredients I mix together by stirring, and heat them up to a temperature of about 260° Fahrenheit, and when they are well mixed I increase the temperature until vulcanization takes place. A compound thus formed will require about an hour, and at the end of that time will become thick and pasty, and on being removed from the vessel and cooled will be soft and elastic.

To make a good medium product I may sometimes take two parts, by measure or weight, of linseed-oil, two parts cotton-seed oil, two parts petroleum, two parts raw turpentine, and two parts sulphur; or I may use two parts linseed-oil, one part cotton-seed oil, two parts heavy petroleum, two parts light coal-tar, one-half part raw turpentine, one part spirits of turpentine, one-sixth part of caoutchouc or gutta-percha, and two parts sulphur. Each of these examples will require about an hour.

Other examples may be, two parts linseed-oil, one part castor-oil, one part petroleum, two parts liquid coal-tar, two parts raw turpentine, and two parts sulphur; or two parts linseed-oil, one part cotton-seed oil, one part pea-nut oil, one part petroleum, three parts light coal-tar, one-half part raw turpentine, one part spirits of turpentine, and four parts sulphur. These compounds will require from thirty to thirty-five minutes each.

I prefer to first heat and mix together the oils by themselves in a suitable vessel, raising them, for this purpose, to the required temperature, which will generally be about 300° Fahrenheit. The mixture may then be cooled down to about 240° to 250° Fahrenheit, at which temperature I add the turpentine, coal-tar, or other resinous body or bodies; and if, as they unite with the oils, any carbon separates to the bottom, I prefer to pour off the liquid portion of the mixture before the sulphur is added.

Finally, when the mixture has become homogeneous, I put in the sulphur, and carry the heat up to 300°, or thereabout, or higher, if necessary, until vulcanization takes place. The product may then be cooled for use.

In these examples the proportions stated are in ounces; but other weights or measures of parts may be adopted. It must, however, be borne in mind that the times of heating will be longer if the quantities given in the examples are increased.

It will, in most cases, be found preferable, when the oils or resinous bodies are not already in a liquid state, to bring them to that condition, and to do this in separate vessels, so as to better insure homogeneity in the product, before commencing to mix them to make my compound.

I also usually obtain better results when I employ together more than one member of the above-mentioned respective classes of elements, instead of only one member alone—that is to say, two or more oils instead of one, and two or more resinous bodies instead of one; and if a light oil be used, I prefer that it should be counterbalanced by a heavy resinous body, such as heavy coal-tar, asphaltum, or bitumen; or, if a heavy oil be used, lighter resinous bodies should be combined with it.

The consistency of the product may be varied, when desired, by varying the proportions of the coal-tar, when that is employed, or of the oils, and also by varying the time and intensity of the heat.

This new compound is both cheap and easily made; and it not only possesses to a useful extent the important properties of elasticity and flexibility peculiar to natural caoutchouc, but also other properties of value, as it is more impervious to water, and resists cold, heat, and sunlight, as well as decomposing agents, better than natural rubber. Hence, for many articles, especially those which require a large weight of raw material, my new compound may be substituted for natural caoutchouc, and will effect a large saving in their cost.

Having thus made known my invention, what I claim, and desire to secure by Letters Patent, is—

1. The herein-described new product, formed by a combination of vegetable or mineral oils, gum-resins, or other resinous bodies, and sulphur.

2. The herein-described new product, formed by a combination of vegetable or mineral oils, gum-resins, or other resinous bodies, and sulphur, with india-rubber or gutta-percha, substantially as specified.

AUSTIN G. DAY.

Witnesses:
T. J. KEANE,
A. J. DE LACY.